United States Patent [19]
Mattei et al.

[11] Patent Number: 4,647,752

[45] Date of Patent: Mar. 3, 1987

[54] METHOD FOR FORMING PERFORATIONS IN BAR-SHAPED ARTICLES

[75] Inventors: Riccardo Mattei; Armando Neri, both of Bologna, Italy

[73] Assignee: G.D. Societa per Azioni, Bologna, Italy

[21] Appl. No.: 802,970

[22] Filed: Nov. 29, 1985

[30] Foreign Application Priority Data

Dec. 6, 1984 [IT] Italy .................................. 3646 A/84

[51] Int. Cl.⁴ .............................................. B23K 26/00
[52] U.S. Cl. ........................ 219/121 LL; 219/121 LK; 219/121 FS
[58] Field of Search ................. 219/121 LL, 121 LK, 219/121 LR, 121 LS, 121 LU, 121 LY, 121 FS; 131/281

[56] References Cited
U.S. PATENT DOCUMENTS 4,565,202  1/1986  Seragnoli et al. ........ 219/121 LK X Primary Examiner—C. L. Albritton
Attorney, Agent, or Firm—Frost & Jacobs

[57] ABSTRACT

A method by which bar-shaped articles, in particular cigarettes, are transferred transversely to their axis by three rollers, of which one is disposed in an intermediate position between the other two and is tangential to these latter at two separate points defining a perforation arc therebetween, and are advanced along said perforation arc supported by respective cradles which are rotated about their axes relative to said intermediate roller at a constant angular speed equal to a whole multiple of the angular speed of said intermediate roller; a pulsed laser beam rotatable about the axis of the intermediate roller being used to form at least one ring of perforations in each article during the time used by said article to traverse said perforation arc.

8 Claims, 6 Drawing Figures

METHOD FOR FORMING PERFORATIONS IN BAR-SHAPED ARTICLES

BACKGROUND OF THE INVENTION

This invention relates to a method for forming perforations in barshaped articles.

The invention finds particularly advantageous application in the production of smoking articles, in particular cigarettes, to which the description given hereinafter specifically refers but without thereby limiting its general application.

In cigarette manufacture, it is known to form so-called "ventilated" cigarettes, i.e. cigarettes provided in the filter zone with a plurality of perforations which enable the smoker to inhale a percentage of external air together with the smoke, with the double advantage of diluting the inhaled smoke and reducing its temperature and thus its harmful element content.

In forming said ventilation perforations it is known to use perforation devices comprising a laser source, possibly of pulsed type, and a focusing device arranged to direct the laser beam on to the cigarettes as they advance along a determined path and possibly rotate about their axis.

In particular, a perforation device is known in which the cigarettes to be perforated are transferred by an inlet roller to a perforation roller which is disposed tangential to said inlet roller and is provided along its outer periphery with a plurality of rotatable cradles each arranged to receive a respective cigarette to be perforated and, when perforated, to transfer it to an outlet roller tangential to said perforation roller.

As it passes through the positions in which it is tangential to the inlet and outlet rollers, each cradle assumes a determined angular rest position relative to the perforation roller in order to facilitate correct transfer of the cigarettes between the inlet, perforation and outlet rollers. While it traverses a central portion of its path of advancement between the two said points of tangency, each cradle is rotated firstly at increasing angular speed, then at constant angular speed, and then at decreasing angular speed. Each cigarette is perforated as it advances along a perforation arc, along which the relative cradle rotates about its axis at the said constant angular speed so as to successively expose determined points of the cigarette periphery to the action of said pulsed laser beam.

In the aforesaid known perforation device, the cigarettes are subjected to considerable positive and negative angular acceleration as they advance along the perforation roller, and this can compromise their structural stability, at least causing tobacco to escape. Moreover, as a result of the need to angularly accelerate and then decelerate said cradles, the length of the perforation arc is relatively small. For this reason, very powerful laser sources have to be used as the energy necessary for perforation must be transferred to each cigarette within an extremely short time.

Finally, from the mechanical aspect the aforesaid known perforation device has a relatively complicated structure due to the need to vary the angular speed with which the cradles rotate about their axis between zero and a determined constant value during each complete revolution of the perforation roller about its axis.

SUMMARY OF THE INVENTION

The object of the present invention is to provide a perforation method which is free from the aforesaid drawbacks.

Said object is attained according to the invention by a method for forming perforations in bar-shaped articles, in particular cigarettes, characterised by comprising the following stages:

translationally moving said articles transversely to their axis along an advancement path defined by at least three conveyor rollers rotatable about their respective axes, of which a first is an inlet roller, a second is an outlet roller, and the third is disposed in an intermediate position between the first two and is tangential thereto at two separate positions on its periphery, these positions defining the opposite ends of a perforation arc;

as they advance along said intermediate roller, housing said articles inside respective cradles each of which is rotatable about its own axis relative to said intermediate roller and which are distributed at constant pitch along the periphery thereof;

causing said cradles to undergo rotation about their axis at a constant angular speed equal to a whole multiple of the angular speed of rotation of said intermediate roller and such as to cause each cradle to undergo a whole number of revolutions about its own axis as it advances along said perforation arc; and using a laser generator unit to form in each of said articles at least one ring of perforations as the article advances along said perforation arc.

BRIEF DESCRIPTION OF THE DRAWINGS

The invention is described hereinafter with reference to the accompanying drawings, which illustrate some non-limiting preferred embodiments thereof, and in which.

DETAILED DESCRIPTION OF THE INVENTION

Figure 1:
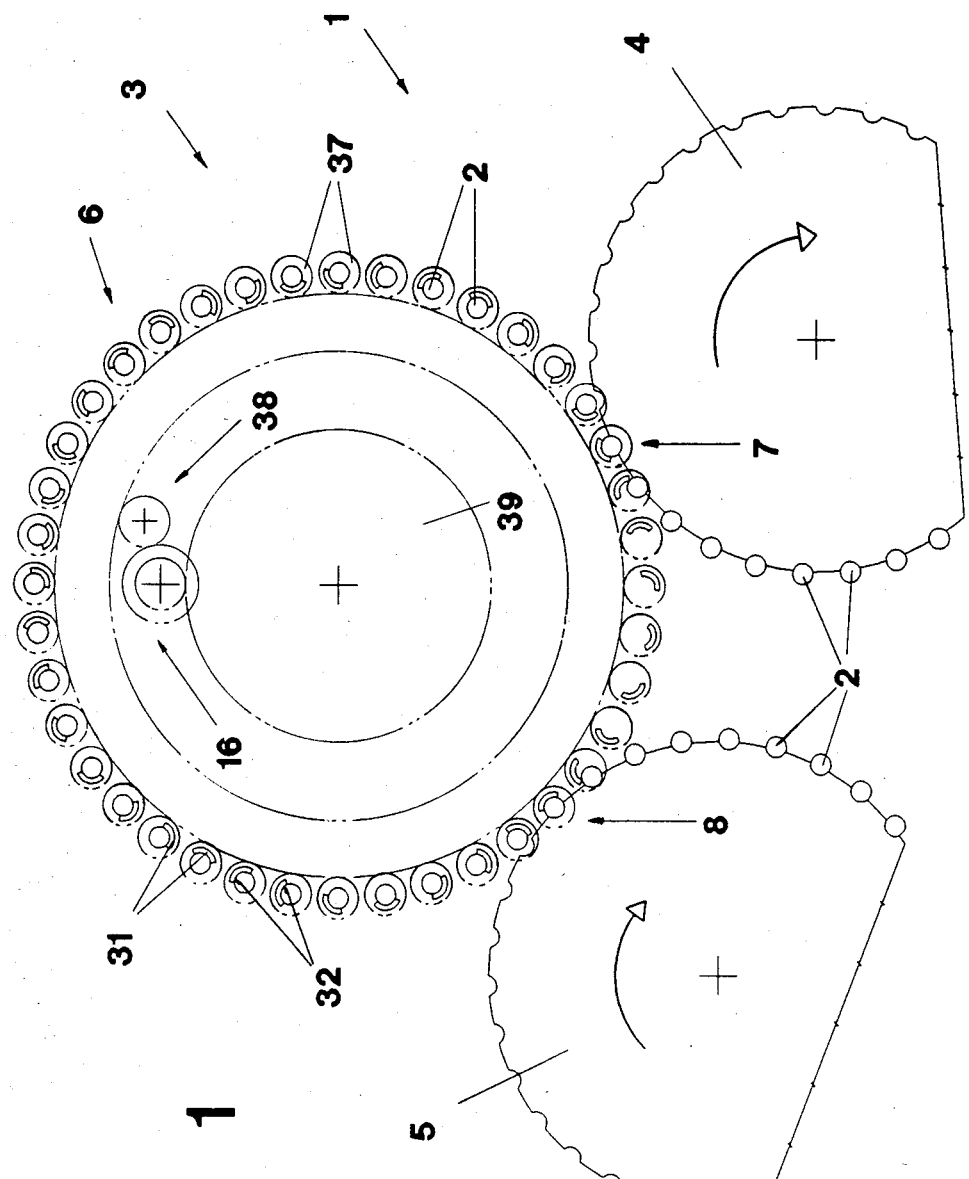
FIG. 1 is a diagrammatic illustration of a perforation device constructed in accordance with the present invention.

In FIG. 1, the reference numeral 1 indicates overall a perforation device for perforating cigarettes or bar-shaped articles 2 and forming part of a filter fitting machine indicated overall by 3. The perforation device 1 comprises an inlet roller 4 and an equally rotating outlet roller 5, between which an intermediate roller 6 is disposed tangential to the rollers 4 and 5 at two separate points of tangency 7 and 8, which define along the periphery of the roller 6 two mutually conjugate arcs of which the first, extending between the points 7 and 8 in the direction of rotation of the roller 6, is known hereinafter as the "perforation arc", and the second is known hereinafter as the "return arc".

Figure 2:
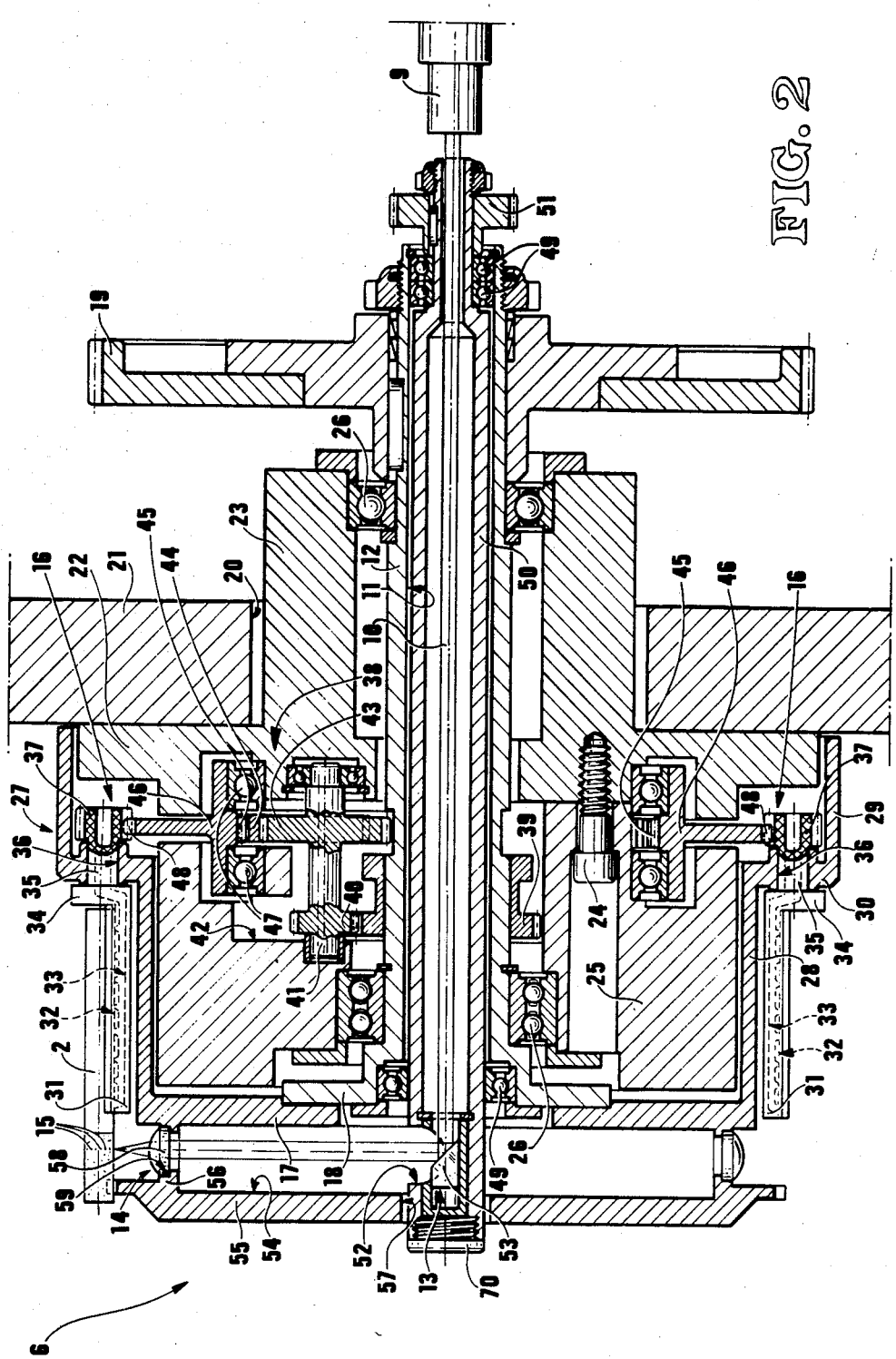
FIG. 2 is an axial section through a first embodiment of a detail of FIG. 1.

As shown in FIG. 2, the perforation device 1 also comprises a pulsed laser generator unit indicated overall by 9 and arranged to emit a laser beam 10 along the axis of a central bore 11 in the central tubular shaft 12 of the roller 6, a reflector device 13 arranged to deflect the beam 10 in a substantially radial direction, a focusing device 14 rotatable with the roller 6 and arranged to focus the beam 10 on the cigarettes 2 in succession in order to form at least one ring of perforations 15 therein, and a rotation device 16 arranged to rotate the cigarettes 2 at a determined constant angular speed about their axis during their translational movement caused by the rotation of the roller 6 about the axis of the shaft 12.

As shown in FIG. 2, the roller 6 is provided with an inner annular end flange 17, the inner periphery of which is rigidly joined to the outer periphery of an annular end flange 18 of the tubular shaft 12. The shaft 12 extends through the roller 6 and, at that end distant from the end connected to this latter, supports a toothed wheel 19 which is coupled in a manner not shown to a source of motion, not illustrated.

An intermediate portion of the shaft 12 extends through a hole 20 in a fixed wall 21 of the filter fitting machine 3. To the outer surface of the wall 21 there is rigidly connected a flange 22 of a tubular member 23 which is coaxial to the shaft 12 and extends through the hole 20 towards the toothed wheel 19. By means of a plurality of axial screws 24, of which only one is shown in FIG. 2, a further tubular member 25 is rigidly connected to the outer surface of the flange 22 in a manner coaxial to the tubular member 23, and together with this latter rotatably supports the shaft 12 by way of two bearings 26, of which the first is engaged in the member 23 and the second engaged in the member 25.

The roller 6 comprises a lateral wall 27 extending from the outer periphery of the flange 17 to the wall 21, and consists of a first cylindrical portion 28 disposed external to the member 25, a second cylindrical portion 29 of greater diameter than the first and extending external to the flange 22, and an intermediate flat annular portion 30 connecting together the facing ends of the cylindrical portions 28 and 29 and extending in a plane normal to the axis of the roller 6.

The rotation device 16 comprises a plurality of cradles 32 uniformly distributed about the outer surface of the portion 28 and each provided with a longitudinal groove 32 defining a seat for a respective cigarette 2, which is retained within the relative groove 32 by suction through a conduit 33 connected to a suction device, not shown.

The cradles 31 extend parallel to the axis of the roller 6, and are each provided, at their end facing the wall 21, with a head 34 from which an axial pin 35 extends, rotatably mounted through a respective bore 36 formed through the portion 30 of the wall 27.

On that end of each pin 35 which lies on the inside of the wall 27 there is keyed a toothed wheel 37 constituting one end gear of a gear train 38, of which the other end gear, indicated by 39, is keyed on to the shaft 12. The gear train 38 comprises a first toothed wheel 40 keyed on a shaft 41 rotatably supported at its ends by the cylindrical members 23 and 25 and housed within a cavity 42 defined between these latter.

Keyed on the shaft 41 there is a second toothed wheel 43, which by way of a toothed wheel 44 supported within the cavity 42 in a manner not shown meshes with the inner toothing 45 of a cylindrical ring gear 46 which is coaxial to the shaft 12 and is supported internally by the tubular members 23 and 25 by way of bearings 47. The ring gear 46 also comprises external toothing 48, which meshes with the toothed wheels 37 of all the pins 35.

Through the shaft 12, by way of bearings 49, there is rotatably mounted a tubular shaft 50, a first end of which emerges from the shaft 12 at the same end as the toothed wheel 19 and carries keyed thereon a toothed wheel 51 coupled to a source of motion, not shown, and the other end of which emerges from the shaft 12 at the same end as the flange 15 and comprises an elongated axial slot 52. The shaft 50 is traversed internally by the beam 10, which is deviated to the outside of the shaft 50 through the slot 52, by means of the reflecting device 13.

The reflecting device 13 comprises an inclined mirror or reflecting element 53 disposed inside the shaft 50 in the path of the beam 10 and arranged to deviate this latter outwards in a substantially radial direction through the slot 52 and into an annular chamber 54 defined on one side by the flange 17 and on the other by an annular wall 55 parallel to the flange 54 and disposed external to the roller 6. The outer periphery of the wall 54 is made rigid with the flange 17 by a tubular element 56 coaxial to the shaft 12, and centrally comprises an axial bore 57 rotatably engaged by one end of the shaft 50.

The tubular element 56 forms the support for the focusing device 14, which comprises a ring of focusing lenses 58 each housed in a respective radial through bore 59 provided in the tubular element 56 in a position facing that end portion of a relative cigarette 2 which is to be perforated. This latter suitably projects in a cantilever manner from the relative cradle 31, and when the device is in operation is disposed with that portion to be perforated facing the relative lens 58 between the flange 17 and wall 55.

When in operation, the toothed wheel 19 and thus the shaft 12 and roller 6 are rotated at a generally constant angular speed, which is transmitted by the gear train 38 to the toothed wheels 37. Thus, as a result of the rotation of the toothed wheel 19, the cradles 31 undergo translational movement transversely to their longitudinal axes conveyed by the roller 6, and each rotates about its axis with a determined angular speed by virtue of the torque transmitted to it by the gear train 38.

With reference to FIG. 1, each cradle 31 is phased angularly relative to the roller 6 such that as this latter rotates, each cradle 31 on reaching the point of tangency 7 lies with the concavity of its groove 33 facing radially outwards so as to be able to receive a respective cigarette 2 from the inlet roller 4.

The cigarettes 2 are transferred from the roller 4 to the grooves 33 of the relative cradles 31 by suction in known manner.

Having received the respective cigarette 2, each cradle 31 proceeds from the point 7 to the point 8 along the perforation arc, translating transversely to its axis by the effect of the rotation of the roller 6 and rotating about itself relative to the roller 6. The transmission ratio of the gear train 38 must necessarily be such that at least two precise complete revolutions of each cradle 31 about its axis correspond to one complete revolution of the roller 6. This is because each cradle 31 must be disposed with its groove 33 facing radially outwards not only at the point 7 but also at the point 8, in order to enable the relative cigarette 2 to be transferred from the roller 6 to the roller 5, and must then return to the same angular position when passing through the point 7. The gear train 38 must therefore be dimensioned such as to make each cradle 31 undergo at least one complete revolution about its axis as the cradle 31 passes through the perforation arc, and at least one further complete revolution as said cradle 31 passes through the return arc.

During the rotation of the roller 6, the shaft 50 is rotated by means of the toothed wheel 51 at a generally constant angular speed greater than that of the roller 6. By virtue of the rotation of the shaft 50 and thus of the mirror 53 rigid therewith, a laser beam 10 emitted continuously by the unit 9 sweeps the perforation arc and the return arc to successively encounter the cigarettes 2 carried by the cradles 31 distributed along the perforation arc. In particular, the said beam deviated by the mirror 53 successively encounters the focusing lenses 58, and is successively focused by each of them on to a respective fixed focal point disposed on the periphery of a respective cigarette 2 for the entire time taken by the beam to sweep the said lens 58.

From the aforesaid, it is apparent that because the mirror 53 moves at a greater speed than the cigarettes 2 advancing transversely to their axis along the perforation arc, the beam deviated by said mirror 53 reaches said cigarettes and is focused on to their surfaces in succession by the lenses 58, so as to form a perforation 15 through each of them at each passage through the respective lens 58.

The number of perforations 15 formed in each cigarette 2 during the time in which it passes through the perforation arc is equal to the number of complete revolutions made by the shaft 50 in the same time. As the cigarettes 2 are rotated continuously about their axis by the relative cradles 31, the said perforations 15 become distributed along a circular ring over each cigarette 2.

In practice, the ratio of the angular speed of the shaft 50 to that of the shaft 12 is of the order of the number of cigarettes 2 distributed along the perforation arc at any instant. In particular, if the gear train 38 is constructed such as to cause each cradle 31 to undergo a single complete revolution about its axis as it passes through the perforation arc, said ratio of the angular speed of the shaft 50 to that of the shaft 12 can be equal to the number of cigarettes 2 distributed along the perforation arc. In contrast, the said ratio must be different from the number of cigarettes 2 distributed along the perforation arc if the cradles 31, as in the example shown in FIG. 1, undergo more than one complete revolution about their axis as they translate transversely along the perforation arc, in order to prevent the perforations made as each cigarette 2 undergoes one revolution about itself becoming superposed on the perforations made during the preceding revolution.

Finally, in practice the unit 9 used is not continuous but instead is pulsed such that the beam 10 is emitted only when the mirror 53 faces a lens 58.

This result can obviously be easily obtained by choosing suitable pulsation sequences for the laser generator unit 9.

However instead of this method, a different method is preferred consisting of measuring the angular position of the mirror 53 and energizing the unit 9 only when the mirror 53 faces a lens 58. There are various practical ways of implementing this method, which are easily derivable from the known art.

Figure 6:
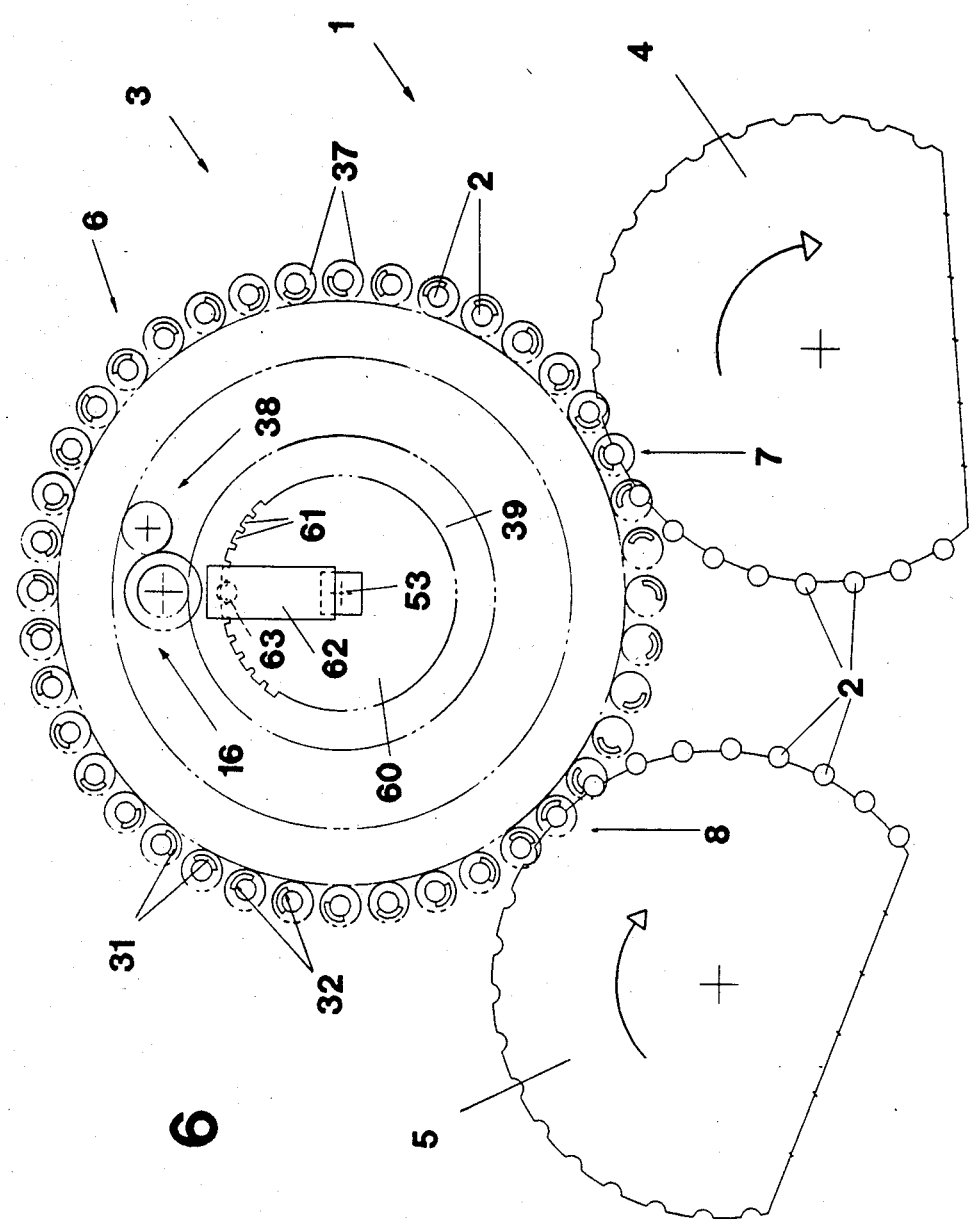
FIG. 6 is a diagrammatic illustration of a modification of a detail of the embodiments shown in FIGS. 2, 3, 4 and 5.

FIG. 6 relates to an extremely simple electromechanical means of implementing the said method, using an activator or trigger device described hereinafter.

In FIG. 6, the reference numeral 60 indicates a disc coaxial to the shaft 12 and rigid with the flange 17. The disc 60 is disposed within the chamber 54 and is provided with a plurality of peripheral teeth 61, each of which is aligned radially with a respective lens 58. An appendix 62 disposed facing the disc 60 extends radially within the chamber 54 from the shaft 50, and supports an inductor element 63 mobile along the ring of teeth 61. When the inductor element 63 passes in front of each tooth 61, it causes the emission of an electrical signal which can be used for controlling the pulsation of the unit 9.

It has already been stated that if the cradles 31 undergo more than one complete revolution about their axis during their translation along the perforation arc, the shafts 12 and 50 must be displaced in phase so as to prevent the perforations 15 made during one complete revolution of the cigarettes 2 about their axis becoming superposed on the perforations 15 made during the previous revolution.

The shafts 12 and 50 can however be kept in phase, ie the ratio of their angular speeds can be kept equal to the number of cigarettes distributed along the perforation arc, if the perforations 15 are to be distributed not only circumferentially but also axially along the cigarettes.

Figure 3:
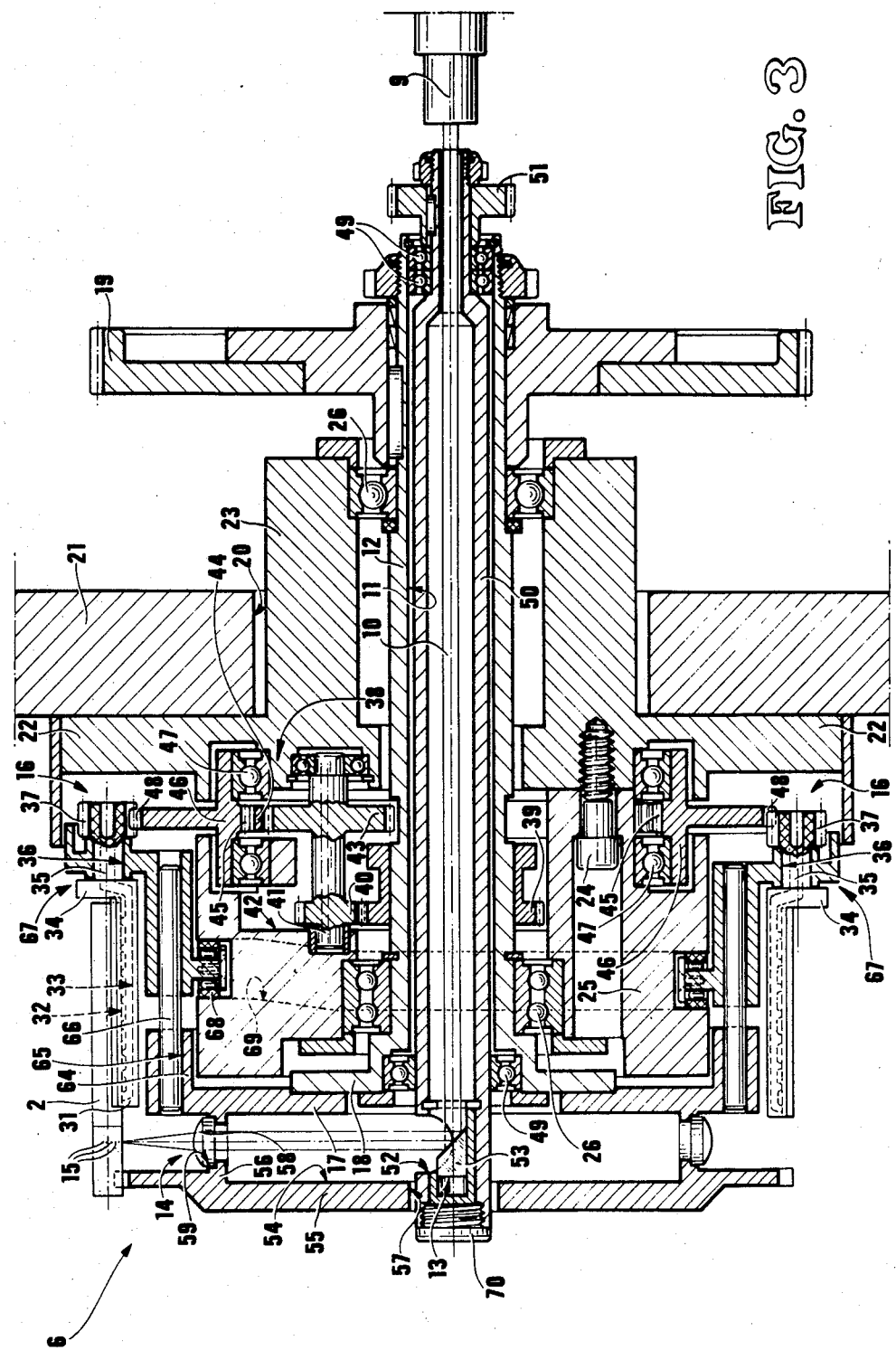
FIG. 3 is an axial section through a second embodiment of a detail of FIG. 1.
Figure 5:
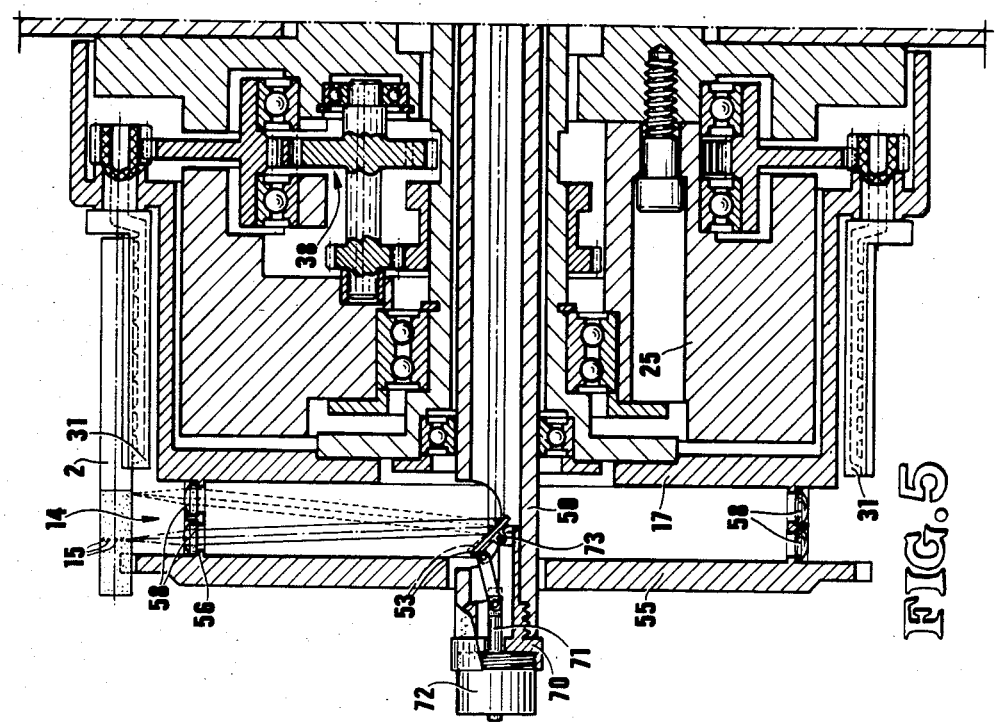
FIG. 5 is an axial section through a modification of the embodiment illustrated in FIG. 4.
Figure 4:
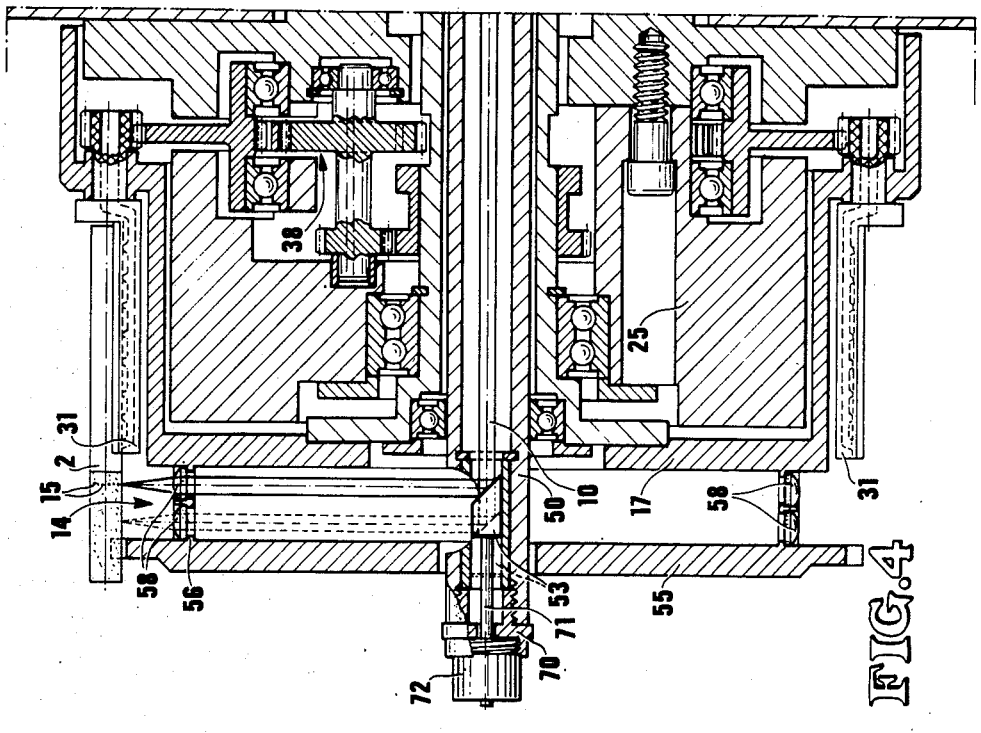
FIG. 4 is an axial section through a further embodiment of a detail of FIG. 1.

Three different methods for implementing this are shown by way of example in FIGS. 3, 4 and 5.

As shown in FIG. 3, an annular ring 64 extending external to the member 25 is rigidly connected to the outer periphery of the flange 17, and comprises in correspondence with each cradle 31 an axial bore 65 in which there is fixed the end of a guide rod 66 for a slide 67 slidable between the ring 64 and ring gear 46, and rotatably supporting a relative pin 35. The toothed wheel 37 of this latter is in slidable engagement with the toothing 48 of the ring gear 46, and is of such a length as to always mesh with the toothing 48 whatever the axial position assumed by the slide 67.

Each slide 67 carries connected to its inner surface a radial cam-following roller 68, which engages a cam groove 69 provided in the outer surface of the member 25.

When in operation, each cigarette 2 as it advances along the perforation arc undergoes a determined axial displacement relative to the focal point of the lenses 58, so as to prevent superposing of the perforations 15.

These latter become distributed either along a substantially spiral-shaped curve or along side-by-side rings depending upon whether the groove 69 is of continuous or stepped profile.

The same result can obviously be attained by keeping the cradles 31 axially fixed and mounting the lenses 58 on a disc which is axially mobile relative to the roller 6 under the thrust of a cam device similar to that defined by the groove 69.

As shown in FIGS. 4 and 5, the tubular element 56 supports more than one ring of lenses 58. In this particular case, there are two adjacent rings of lenses 58 on the assumption that the cradles 31 undergo two complete revolutions about their axes as they advance along the perforation arc.

The output rod 71 of an actuator device 72 is slidably mounted through a closure plug 70 for the shaft 50 and is connected to the mirror 53.

As shown in FIG. 4, the mirror 53 is mounted axially slidable along the shaft 50 under the thrust of the rod 71 between two positions in order to selectively direct the beam 10 onto one or other of the adjacent lenses 58 associated with each cradle 31, the actuator device being controlled in such a manner as to prevent the perforations 15 becoming superposed on the cigarettes 2.

In FIG. 5, the rod 71 is arranged to cause the mirror 53 to assume two separate angular positions relative to the shaft 50 about a hinge 73 which has its axis perpendicular to the axis of the shaft 50 and connects the mirror 53 to this latter, in order to selectively deviate the beam 10 on to one or other of the lenses of each pair of adjacent lenses 58.

We claim:

1. A method for forming perforations in bar-shaped articles (2), in particular cigarettes, characterised by comprising the following stages:

translationally moving said articles (2) transversely to their axis along an advancement path defined by at least three conveyor rollers (4, 5, 6) rotatable about their respective axes, of which a first (4) is an inlet roller, a second (5) is an outlet roller, and the third (6) is disposed in an intermediate position between the first two and is tangential thereto at two separate positions on its periphery, these positions defining the opposite ends of a perforation arc;

as they advance along said intermediate roller (6), housing said articles (2) inside respective cradles (31) each of which is rotatable about its own axis relative to said intermediate roller (6) and which are distributed at constant pitch along the periphery thereof;

causing said cradles (31) to undergo rotation about their axis at a constant angular speed equal to a whole multiple of the angular speed of rotation of said intermediate roller (6) and such as to cause each cradle (31) to undergo a whole number of revolutions about its own axis as it advances along said perforation arc; and using a laser generator unit (9) to form in each of said articles (2) at least one ring of perforations (15) as the article advances along said perforation arc.

2. A method as claimed in claim 1, characterised in that said laser unit (9) comprises a generator for generating a pulsed laser beam (10), and at least one reflector element (53) for selectively directing said beam (10) on to each of said articles (2); said reflector element (53) being mounted rotatable about the axis of said intermediate roller (6) and being rotated at an angular speed greater than that of said intermediate roller (6).

3. A method as claimed in claim 2, characterised by comprising a further stage consisting of making each of said articles (2) and the relative focal pint of a laser beam (10) emitted by said generator unit (9) and reflected by said reflector element (53) undergo a relative displacement in the direction of the axis of rotation of said intermediate roller (6) during the time in which said article (2) traverses said perforation arc.

4. A method as claimed in claim 3, characterised in that each of said cradles (31) is coupled to said intermediate roller (6) in an axially slidable manner, and is associated with actuator means (68, 69) for implementing said axial displacement during the traversing of said perforation arc.

5. A method as claimed in claim 3, characterised in that said intermediate roller (6) supports a focusing device (14) comprising, for each of said articles (2), at least two focusing lenses (58) disposed side-by-side in a direction parallel to the axis of said intermediate roller (6), said relative displacement being implemented by moving said reflector element (53) relative to said intermediate roller (6) in such a manner as to move a reflected laser beam (10) from one to the other of said lenses (58) in accordance with a determined relationship.

6. A method as claimed in claim 5, characterised in that the displacement of said reflector element (53) consists of a translational movement in the direction of the axis of said intermediate roller (6).

7. A method as claimed in claim 5, characterised in that the displacement of said reflector element (53) consists of a rotary movement about an axis perpendicular to the axis of rotation of said intermediate roller (6).

8. A method as claimed in claim 1, characterised in that said laser generator unit (9) is pulsed by means of an activator or trigger device (60–63) associated with said reflector element (53) and arranged to cause a laser pulse to be emitted each time said reflector element (53), in sweeping said perforation arc, encounters one of said articles (2).

* * * * *